United States Patent [19]
Klees

[11] 4,306,412
[45] Dec. 22, 1981

[54] JET ENGINE AND METHOD OF OPERATING THE SAME
[75] Inventor: Garry W. Klees, Mercer Island, Wash.
[73] Assignee: The Boeing Company, Seattle, Wash.
[21] Appl. No.: 963,305
[22] Filed: Nov. 24, 1978
[51] Int. Cl.³ ............................ F02K 3/06; F02K 1/06
[52] U.S. Cl. .......................................... 60/204; 60/224; 60/226 R; 60/39.16 R; 60/39.17; 60/39.25; 181/215
[58] Field of Search ...................... 60/224, 204, 226 R, 60/39.17, 39.16 R, 39.25; 181/210, 213, 215

[56] References Cited
U.S. PATENT DOCUMENTS 3,449,914 6/1969 Brown ................................ 60/226 B
3,527,317 9/1970 Metsinger .......................... 60/226 R
3,867,813 2/1975 Leibach ............................. 60/226 R
4,085,583 4/1978 Klees .................................. 60/39.17

FOREIGN PATENT DOCUMENTS 1099971 1/1968 United Kingdom ............. 60/226 R

Primary Examiner—Douglas Hart
Attorney, Agent, or Firm—Ronald E. Suter; Bernard A. Donahue

[57] ABSTRACT

A jet engine having its turbine section and exhaust nozzles particularly arranged to alleviate noise. There is a forward turbine section positioned in a first passageway to receive all or substantially all of the gaseous discharge from the combustion section of the jet engine. There are second and third coannular passageways positioned downstream of the first passageway, with the second passageway being positioned radially inwardly of the third passageway. A second turbine stage is positioned in the second inner passageway to receive a portion of the gaseous flow from the first passageway so as to be driven thereby, with the first portion of gaseous flow being discharged at a relatively low velocity at a radially inward location. A second portion of the gaseous flow passes from the first passageway to the third passageway and is discharged at a relatively high velocity in a generally annular pattern radially outward of the flow of the first portion of the gaseous flow. Thus the gaseous flow is in a velocity profile to alleviate noise from the engine.

16 Claims, 2 Drawing Figures

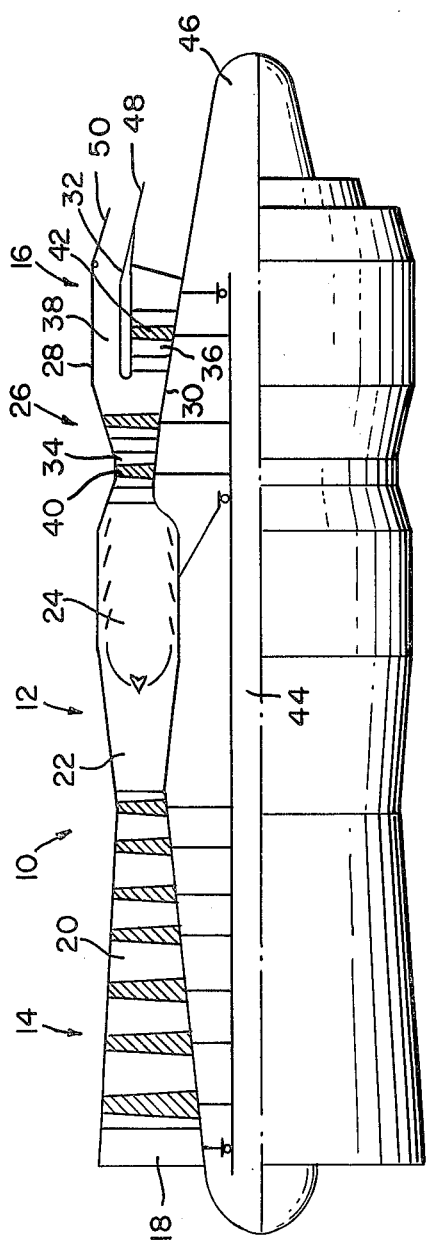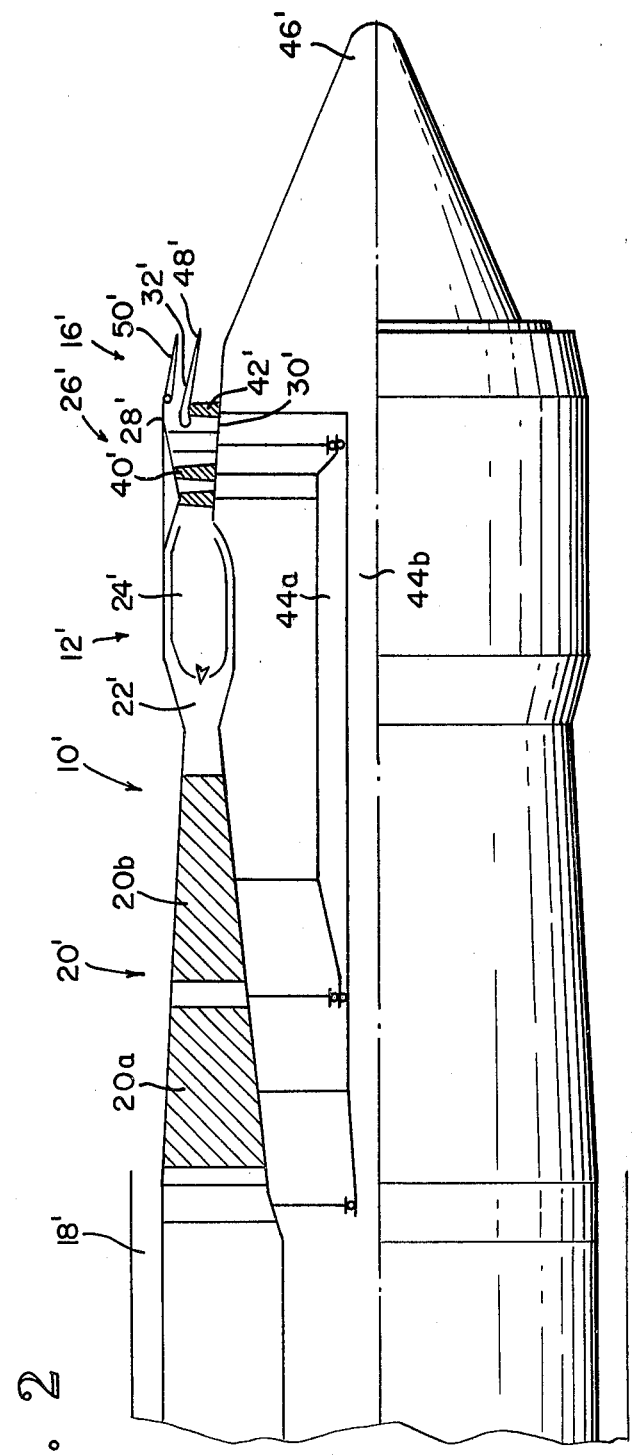

JET ENGINE AND METHOD OF OPERATING THE SAME

BACKGROUND OF THE INVENTION

Jet noise still remains as a major problem in the design of jet engines. Certain experimental and developmental work has led to the conclusion that in turbofan engines having a two nozzle system, noise alleviation can be achieved by utilizing augmentors in the outer fan duct. This produces a velocity profile of the jet exhaust where there is a higher velocity in the outer coannular jet flow, and a lower velocity in the inner portion of the jet flow.

It is an object of the present invention to provide a jet engine with the turbine section and exhaust section so arranged as to produce a jet exhaust velocity profile to alleviate noise generated by the engine.

In a patentability search which was conducted on the concept of the present invention and some other concepts relating to jet engines, a number of United States patents were disclosed. While an examination by the applicant of these various patents indicates that they are not directly relevant to the present invention as prior art, these are cited in this application to insure that the applicant is fully complying with his obligation to disclose to the U.S. Patent and Trademark Office all prior art which might be considered relevant.

U.S. Pat. No. 2,527,732, Imbert, disclosed a turboprop engine where in a lower power mode air is directed away from the turbine. When there is requirement for a rapid increase in power, the bypass air is directed into the turbine to create the additional power in a relatively short period of time.

U.S. Pat. No. 2,630,673, Woll, disclosed a jet engine where air from the compressor is directed through a bypass passageway to provide cooling for a variable area nozzle at the aft end of the engine.

U.S. Pat. No. 3,049,869, Grenoble, directs air from a low-pressure location in the compressor through a bypass passageway to the aft end of the engine. This bypassed air is combined with over-rich exhaust gas to reburn the mixture at a location rearwardly of the turbine in the engine.

U.S. Pat. No. 3,161,018, Sandre, discloses a combined turbojet-ramjet engine where low pressure air is used in conjunction with a bypass turbojet.

U.S. Pat. No. 3,296,800, Keenan et al, shows an arrangement somewhat similar to the Sandre patent noted immediately above.

U.S. Pat. No. 3,514,952, Schumacher et al, discloses a variable bypass turbo-fan engine. During subsonic cruise, the air from the fan is directed through the bypass ducts. During supersonic cruise, valve means close off the bypass ducts so that the air is directed through the compressor and thence to the combustion chamber of the engine.

U.S. Pat. No. 3,520,138, Fox, discloses a plurality of power turbines arranged in series with passageways provided around the second and third turbines, and with valves disposed in the passageways to progressively open or close the passageways. The second and third power turbine combinations are connected to thrust-producing devices for vertical takeoff and landing aircraft or some other desired application.

U.S. Pat. No. 3,641,766, Uehling, discloses an engine arrangement where the thrust output of a gas turbine engine is modulated without the necessity of varying the speed of the engine. This device bypasses a portion of the compressor discharge to a manifold which has a plurality of swirl-inducing nozzles which in turn are able to decrease the delay time between increased thrust demand and actual thrust output while maintaining engine speed.

U.S. Pat. No. 3,879,941, Sargisson, discloses a variable cycle gas turbine engine with a fan having a forward section axially spaced from an aft section. A variable flow bypassing valve is disposed intermediate the forward and aft fan sections in order that air flow between the forward and aft fan sections may be connected either in series flow relationship or in bypassing parallel relation depending upon the desired mode of engine operation. The variable cycle engine also includes a variable flow geometry inlet duct in direct flow connection to the fan for furnishing an inlet airflow to the fan. Within the variable engine cycle is a core engine having a compressor, combuster and turbine in series flow relationship, wherein the compressor receives a portion of the compressed airflow from the fan. A fan turbine section downstream of the core engine is also provided to drive the fan.

U.S. Pat. No. 3,841,091, Sargisson et al, discloses a jet engine which is intended to operate efficiently at both subsonic and supersonic speeds. This embodies a variable cycle tandem propulsion system comprising a forward turbo-fan engine having a fan, gas generator, and power turbine arranged in axially serial flow relation. An independent turbojet engine is co-axially displaced downstream of the turbo-fan engine and includes a compressor, a combuster and turbine also arranged in axially spaced serial flow relation. An outer exhaust duct is provided for directing the exhaust steam from the turbo-fan engine rearward around the turbojet engine. There is also included a variable cross over valve means which may be operated in two modes, e.g., subsonic and supersonic. In the subsonic mode, air flow exiting from the fan which bypasses around the gas generator is directed to the outer exhaust duct means while at the same time a separate inlet ambient air flow stream is directed to the inlet of the turbojet. In its supersonic mode, air flow exiting from the fan which bypasses around the gas generator is directed to the turbojet inlet, thereby supercharging the inlet airflow to the turbojet.

U.S. Pat. No. 3,068,644, Worsham et al, relates primarily to a particular type of nozzle wherein shroud flaps are used to control the configuration of a secondary nozzle through which secondary air is directed.

U.S. Pat. No. 3,769,797, Stevens, discloses an engine configuration where bypass flow of an engine is used for vertical takeoff and landing mode of operation.

U.S. Pat. No. 2,458,600, Imbert et al, shows an arrangement of a turbo-fan engine.

U.S. Pat. No. 2,505,660, Baumann, discloses a thrust "augmentor" comprising in combination at least two coaxial contra-rotationally bladed turbine rotors adapted to be driven by a flow of high velocity combustive gas.

U.S. Pat. No. 3,118,276, Keenen et al, discloses a turbo-fan engine where the fan air communicates with the exhaust gas duct downstream of the turbine or turbines through one or more mixing chutes which extend into the exhaust gas duct.

U.S. Pat. No. 3,316,717, Castle et al, discloses a turbofan engine having a variable bypass ratio. This is accomplished by placing fans fore and aft of the gas turbine unit. The fans operate in series for a low bypass ratio, or in parallel for a high bypass ratio.

U.S. Pat. No. 3,903,690, Jones, discloses a turbo-fan engine where all of the bladed stages of the turbine and substantially all of the compressor blades are rotor stages.

U.S. Pat. No. 3,910,375, Hache et al, discloses a jet engine silencer where there is a jet nozzle, and means are provided to inject air into the flow steam emitted from the jet nozzle.

U.S. Pat. No. 3,987,621, Sabatella, Jr. et al, simply discloses a turbo-fan engine where the inner stream includes no noise suppression and the jet exhaust noise generated at take-off is reduced in the outer jet exhaust stream.

SUMMARY OF THE INVENTION

In the jet engine of the present invention, there is a housing having an upstream inlet end to receive intake air, and a downstream exhaust end to discharge jet exhaust. Intake air is received in an air inlet and directed to a compressor mounted in the housing rearwardly of the inlet and arranged to compress air flowing into the inlet. Downstream of the compressor there is means defining a combustion chamber arranged to receive compressed air from the compressor and burn fuel in the compressed air to provide a gaseous flow from the combustion chamber.

Downstream of the combustion chamber, there is means defining a first annular passageway to receive gaseous flow from the combustion chamber. There is additional means defining second and third generally coannular passageways, with the second passageway being positioned radially inwardly of the third passageway and arranged to receive a first portion of gaseous flow from the first passageway. The third passageway is arranged to receive a second portion of gaseous flow from the first passageway.

A turbine first stage is positioned in the first passageway and arranged to receive the gaseous flow from the combustion chamber so as to be driven thereby, with the gaseous flow then proceeding to said second and third passageways. A turbine second stage is positioned in the second passageway and arranged to receive the first portion of gaseous flow so as to be driven thereby. There is nozzle means positioned downstream of the second and third passageways to receive the first portion of gaseous flow and discharge this first portion at a radially inward location at a relatively low velocity, and to receive the second portion of gaseous flow and discharge said second portion at a relatively high velocity in a generally annular pattern radially outward of the radially inward location of the first gaseous portion. Thus the engine is able to discharge its jet exhaust in a coannular pattern to alleviate noise generated by the engine.

In one embodiment, there is a single spool compressor, and both stages of the turbine are operatively connected to the same compressor spool to drive the compressor. In a second embodiment, there is a double spool compressor, with the first turbine stage driving the second spool of the compressor, and the second turbine stage driving the first spool of the compressor.

The present invention is well adapted for use in a supersonic jet engine where all or at least a substantial portion of the air from the compressor is directed through the turbine stage of the engine. The inlet of the supersonic engine is arranged to receive intake air at a subsonic velocity and also to receive intake air at a supersonic velocity and reduce said air to a subsonic velocity.

In the method of the present invention, an engine is provided such as that described above. All of the gaseous discharge from the combustion chamber, or at least a substantial portion of the gaseous discharge is directed through the first passageway to drive the turbine first stage. The gaseous discharge from the turbine first stage is directed into second and third coannular passageways. That portion of the gaseous discharge which is directed into the second inner passageway drives a second turbine stage and then passes outwardly through nozzle means at a radially inward location at a relatively low velocity. That portion of the gaseous discharge which is directed through the third annular passageway is directed at a relatively high velocity in a generally annular pattern radially outward of the radially inward location of the gaseous discharge from the turbine second stage.

Other features of the present invention will become apparent from the following detailed description.

BRIEF DESCRIPTION OF THE DRAWING

FIG. 1 is a longitudinal semi-schematic view, partly in section, of a first embodiment of the jet turbine engine of the present invention; and FIG. 2 is a view similar to FIG. 1 showing a second embodiment thereof.

DESCRIPTION OF THE PREFERRED EMBODIMENTS

The engine 10 of the first embodiment of the present invention, shown in FIG. 1, comprises a housing 12 having a forward inlet end 14 and an aft exhaust end 16. At the inlet end 14 there is an inlet structure, a portion of which is shown at 18, which directs intake air into the engine 10.

Immediately aft of the inlet 18 is a compressor 20, which in this first embodiment is shown as a single spool compressor. Immediately downstream or aft of the compressor 20, the housing 12 defines a combustion chamber 22 in which is mounted a fuel injection and igniting device, indicated schematically at 24. The combustion chamber 22 receives the pressurized air from the compressor 20 and fuel is burned in this pressurized air to provide a gaseous flow from the combustion chamber in a downstream direction.

Downstream of the combustion chamber 22 is a turbine section, generally designated 26. This turbine section 26 comprises an outer annular wall means 28, an inner annular wall means 30 and an intermediate annular wall means 32. The forward portions of the outer and inner wall means 28 and 30, respectively, define a first annular passageway 34 which is positioned immediately downstream of the combustion chamber 22 to receive all or at least a substantial portion of the gaseous flow from the combustion chamber 22. Downstream of the first passageway 34 is a second inner annular passageway 36 defined by the intermediate wall 32 and the rear portion of the inner wall 30. Coannular with and positioned radially outwardly of the second passageway 36 is a third outer passageway 38 defined by the intermediate wall 32 and the rear portion of the outer wall 28.

A turbine first stage 40 is positioned in the first passageway 34 so that the gaseous flow through the first passageway 34 drives the turbine first stage 40. A turbine second stage 42 is positioned in the second passageway 36. A first portion of the gaseous flow from the first passageway 34 passes through the second passageway 36 to drive the turbine second stage 42. A second portion of the gaseous flow from the first passageway 36 passes in an outer annular pattern through the third outer passageway 38.

Both the turbine first stage 40 and second stage 42 are connected to a common shaft 44, the forward end of which is connected to the compressor 20. The rear end of the inner wall 30 terminates in a tail cone 46; the rear end of the intermediate wall 32 terminates in an inner variable area nozzle member 48; and the rear end of the outer wall 28 terminates in an outer variable area nozzle 50.

To describe the operation of the present invention, the intake air passes through the inlet 18, is compressed by the compressor 20, and proceeds to the combustion chamber 22, where fuel is ignited in the air to provide a gaseous discharge. The gaseous discharge flows through the first passageway 26 to drive the turbine first stage 40. Thus, the gaseous discharge passing from the turbine first stage 40 has a certain amount of energy extracted from the gaseous discharge, but is still at a relatively high velocity and at a relatively high temperature.

The intermediate wall 32 splits the gaseous discharge into a first inner portion which passes through the second inner passageway 36 and a second outer portion which passes through the third passageway 38. The first portion of the gaseous discharge drives the turbine second stage 42 so that yet more energy is extracted from that first gaseous discharge portion to further reduce the velocity and temperature of the first portion of the gaseous discharge. This first portion of the gaseous flow is discharged at a radially inward location defined by the inner nozzle 48 and the tail cone 46.

Thus, the gaseous discharge from the jet engine is in a coannular pattern, with the outer annular portion of the discharge being at a higher velocity, and the inner portion being at a relatively low velocity. As indicated previously, this pattern of gaseous discharge has the effect of alleviating the noise generated by the exhaust gases of the jet engine 10.

The passageways 34, 36 and 38 and the turbine stages 40 and 42 can be sized and arranged so that the mass flow and exit velocities of the first and second portions of the gaseous discharge can be adjusted for minimum noise. Preliminary analysis indicates that while there is the added weight of the turbine second stage 42 and added nozzle 48, this is offset to some extent by the reduction in work required in the turbine first stage 40 so that a relatively small turbine first stage 40 can be used. This reduction in size of the turbine first stage 40 would allow a smaller disc, and a higher shaft speed which in turn would permit a reduction in the number of compressor and/or turbine stages that would otherwise be necessary to do the same amount of work. This weight reduction can be significant, and possibly result in a net weight saving.

A second embodiment of the invention is shown in FIG. 2. Components of the second embodiment which are similar to those of the first embodiment will be given like numerical designations with a prime (') suffix distinguishing those of the second embodiment.

The essential difference between the second embodiment and the first embodiment is that in the second embodiment, the compressor section 20' is made as a two spool compressor, namely a forward spool 20a and a rear spool 20b. The turbine first stage 40' is connected through an outer shaft 44a to the second high pressure spool 20b of the compressor section 20'. The turbine second stage 42' is connected through an inner shaft 44b to the forward low pressure spool 20a of the compressor section 20'.

The engine of the present invention is particularly well adapted for use in a supersonic jet engine. Thus, in the second embodiment of FIG. 2, the engine 10' is shown as having a supersonic jet inlet 18'. For ease of illustration, only a portion of the inlet 18' is shown. However, it is to be understood that the inlet 18' functions to take in air at subsonic velocity, or take in air at a supersonic velocity and reduce this air to a subsonic velocity before it is directed to the compressor section 20'.

Turbine stage 42 may in some cases require multiple stages, and turbine stage 40 may require more or less stages than the two stages assumed. Selection of the optimum turbine arrangement would be the result of weight and gas path alignment trade-offs.

In other respects, the main components of the engine 10' of the second embodiment are substantially similar to those of the first embodiment. Accordingly, there will be no detailed description of these other components. However, the main components have been given numerical designations in FIG. 2 corresponding to those in the first embodiment of FIG. 1 to identify these corresponding relationships.

What is claimed is:

1. A jet engine comprising:
    a. a housing having an upstream inlet end to receive intake air, a downstream exhaust end to discharge jet exhaust, and an outer side surface exposed directly to free stream air flow,
    b. an air inlet arranged to receive intake air,
    c. a compressor mounted in said housing downstream of said inlet and arranged to compress air flowing into said inlet,
    d. means defining a combustion chamber downsteam of said compressor to receive compressed air therefrom and burn fuel in said compressed air to provide a gaseous flow from said combustion chamber,
    e. first wall means defining a first generally annular passageway downsteam of said combustion chamber to receive gaseous flow from said combustion chamber,
    f. second wall means defining second and third generally coannular passageways, said second passageway being positioned radially inwardly of said third passageway and arranged to receive a first portion of gaseous flow from said first passageway, said third passageway arranged to receive a second portion of gaseous flow from said first passageway,
    g. a turbine first stage positioned in said first passageway and arranged to receive the gaseous flow from said combustion chamber so as to be driven thereby with said gaseous flow proceeding to said second and third passageways,
    h. a turbine second stage positioned in said second passageway and arranged to receive the first portion of the gaseous flow so as to be driven thereby,
    i. said turbine first stage and said turbine second stage both being operatively connected to said compressor, j. nozzle means positioned downstream of said second and third passageways to receive the first portion of gaseous flow and discharge said first portion at a radially inward location at a relatively low velocity, and to receive the second portion of gaseous flow and discharge said second portion at a relatively higher velocity in a generally annular pattern radially outward of the radially inward location of the first portion of gaseous flow and immediately adjacent to a rear portion of said outer side surface of the housing, whereby said engine discharges its jet exhaust in a pattern where the second portion of gaseous flow is discharged immediately adjacent to the free air stream to alleviate noise generated by said engine.

2. The jet engine as recited in claim 1, wherein said compressor is a single spool compressor, and there is a drive shaft connected to both the first turbine stage and second turbine stage and also operatively connected to said compressor.

3. The engine as recited in claim 1, wherein said compressor comprises a multiple spool compressor having a first low pressure spool and a second high pressure spool, said turbine first stage being operatively connected to said second high pressure spool, and said turbine second stage being operatively connected to said first low pressure spool.

4. The engine as recited in claim 1, wherein there is first outer annular wall means, second inner annular wall means, and third intermediate wall means, said first and second wall means having forward portions defining said first passageway, said intermediate wall means and a rear portion of said inner wall means defining said second passageway, and said intermediate wall means and a rear portion of said outer wall means defining said third passageway, with said intermediate wall means separating the gaseous flow from the first passageway into said first and second portions of gaseous flow.

5. The engine as recited in claim 1, wherein there is at a rear portion of said intermediate wall means an inner variable area nozzle member, and there is at a rear end of said outer wall means an outer variable area nozzle member.

6. A jet engine comprising:
a. a housing having an upstream inlet end to receive intake air, a downstream exhaust end to discharge jet exhaust, and an outer side surface exposed directly to free stream air flow,
b. an air inlet arranged to receive intake air,
c. a compressor mounted in said housing downstream of said inlet and arranged to compress air flowing into said inlet,
d. means defining a combustion chamber downstream of said compressor to receive compressed air therefrom and burn fuel in said compressed air to provide a gaseous flow from said combustion chamber,
e. a turbine section comprising:
1. an outer annular wall means,
2. an inner annular wall means spaced radially inwardly from said outer annular wall means,
3. an intermediate annular wall means positioned between said inner and outer annular wall means,
4. forward portions of said outer and inner annular wall means defining a first generally annular passageway downstream of said combustion chamber to receive gaseous flow from said combustion chamber,
5. a rear portion of said inner annular wall means and said intermediate annular wall means defining a second inner annular passageway,
6. a rear portion of said outer annular wall means and said intermediate wall means defining a third annular passageway positioned radially outwardly of said second passageway,
7. a turbine first stage positioned in said first passageway and arranged to receive the gaseous flow from said combustion chamber so as to be driven thereby, with said gaseous flow proceeding to said second and third passageways,
8. said intermediate wall means separating the gaseous flow into first and second portions, with said first portion travelling through said second passageway, and said second portion travelling through said third passageway,
9. a turbine second stage positioned in said second passageway and arranged to receive the first portion of gaseous flow so as to be driven thereby,
f. nozzle means positioned downstream of said second and third passageways to receive the first portion of gaseous flow and discharge said first portion at a radially inward location at a relatively low velocity, and to receive the second portion of gaseous flow and discharge said second portion at a relatively higher velocity in a generally annular pattern radially outward of the radially inward location of the first portion of gaseous flow and immediately adjacent to a rear portion of said outer side surface of the housing, whereby said engine discharges its jet exhaust in a pattern where the second portion of gaseous flow is discharged immediately adjacent to the free air stream to alleviate noise generated by said engine.

7. The jet engine as recited in claim 6, wherein said compressor is a single spool compressor, and there is a drive shaft connected to both the first turbine stage and second turbine stage and also operatively connected to said compressor.

8. The engine as recited in claim 6, wherein said compressor comprises a multiple spool compressor having a first low pressure spool and a second high pressure spool, said turbine first stage being operatively connected to said second high pressure spool, and said turbine second stage being operatively connected to said first low pressure spool.

9. The engine as recited in claim 6, wherein there is at a rear portion of said intermediate wall means an inner variable area nozzle member, and there is at a rear end of said outer wall means an outer variable area nozzle member.

10. A supersonic jet engine comprising:
a. a housing having an upstream inlet end to receive intake air, a downstream exhaust end to discharge jet exhaust, and an outer side surface exposed directly to free stream air flow,
b. an air inlet arranged to receive intake air at subsonic velocity and also to receive intake air at supersonic velocities and reduce said air to subsonic velocity,
c. a compressor mounted in said housing downstream of said inlet and arranged to compress air flowing into said inlet,
d. means defining a combustion chamber downstream of said compressor to receive compressed air therefrom and burn fuel in said compressed air to provide a gaseous flow from said combustion chamber,
e. means defining a first generally annular passageway downstream of said combustion chamber to receive gaseous flow from said combustion chamber,
f. means defining second and third generally coannular passageways, said second passageway being positioned radially inwardly of said third passageway and arranged to receive a first portion of gaseous flow from said first passageway, said third passageway arranged to receive a second portion of gaseous flow from said first passageway,
g. a turbine first stage positioned in said first passageway and arranged to receive the gaseous flow from said combustion chamber so as to be driven thereby with said gaseous flow proceeding to said second and third passageways,
h. a turbine second stage positioned in said second passageway and arranged to receive the first portion of the gaseous flow so as to be driven thereby,
i. said turbine first stage and said turbine second stage both being operatively connected to said compressor,
j. nozzle means positioned downstream of said second and third passageways to receive the first portion of gaseous flow and discharge said first portion at a radially inward location at a relatively low velocity, and to receive the second portion of gaseous flow and discharge said second portion at a relatively higher velocity in a generally annular pattern radially outward of the radially inward location of the first portion of gaseous flow and immediately adjacent to a rear portion of said outer side surface of the housing, whereby said engine discharges its jet exhaust in a pattern where the second portion of gaseous flow is discharged immediately adjacent to the free air stream to alleviate noise generated by said engine.

11. The jet engine as recited in claim 10, wherein said compressor is a single spool compressor, and there is a drive shaft connected to both the first turbine stage and second turbine stage and also operatively connected to said compressor.

12. The engine as recited in claim 10, wherein said compressor comprises a multiple spool compressor having a first low pressure spool and a second high pressure spool, said turbine first stage being operatively connected to said second high pressure spool, and said turbine second stage being operatively connected to said first low pressure spool.

13. The engine as recited in claim 10, wherein there is at a rear portion of said intermediate wall means an inner variable area nozzle member, and there is at a rear end of said outer wall means an outer variable area nozzle member.

14. In a jet engine, comprising:
a. a housing having an upstream inlet end to receive intake air, a downstream exhaust end to discharge jet exhaust, and an outer side surface exposed directly to free stream air flow,
b. an air inlet arranged to receive intake air,
c. a compressor mounted in said housing downstream of said inlet and arranged to compress air flowing into said inlet,
d. means defining a combustion chamber downstream of said compressor to receive compressed air therefrom and burn fuel in said compressed air to provide a gaseous flow from said combustion chamber, a method of utilizing the gaseous flow from said combustion chamber to drive a turbine section so as to drive said compressor and provide a jet exhaust having a discharge pattern to alleviate noise, said method comprising:
a. directing the gaseous flow from the combustion chamber through a first generally annular passageway downstream of the combustion chamber to drive a turbine first stage,
b. dividing gaseous flow from the turbine first stage into first and second portions of gaseous flow,
c. directing said first portion of gaseous flow through a second generally annular passageway positioned downstream of said first passageway at a radially inward location, and driving a turbine second stage by said first portion of gaseous flow,
d. transmitting power from said turbine first and second stages to said compressor,
e. directing a second portion of gaseous flow through a third generally annular passageway positioned radially outwardly of said second passageway,
f. discharging the first and second portions of gaseous flow through nozzle means positioned downstream of the second and third passageways in a coannular pattern with the second portion of gaseous flow being positioned radially outwardly of and at a higher velocity than the first portion of gaseous flow, with the second portion of gaseous flow being immediately adjacent to a rear portion of the outer side surface of the housing, whereby said gaseous flow is discharged as jet exhaust in a pattern where the second portion of gaseous flow is discharged immediately adjacent to the free air stream to alleviate noise.

15. The method as recited in claim 14, wherein said compressor comprises a single spool compressor, said method further comprising transmitting power from said turbine first stage and from said turbine second stage directly to said single spool compressor.

16. The method as recited in claim 14, wherein said compressor comprises a multiple spool compressor having a first low pressure spool and a second high pressure spool, said method further comprising transmitting power from said turbine first stage to said second high pressure spool, and transmitting power from said turbine second stage to said first low pressure spool.

* * * * *